(12) United States Patent
Zheng et al.

(10) Patent No.: US 7,911,809 B2
(45) Date of Patent: Mar. 22, 2011

(54) SWITCHING POWER SUPPLY CIRCUIT

(75) Inventors: Jie-Jian Zheng, Shenzhen (CN); Tong Zhou, Shenzhen (CN)

(73) Assignees: Innocom Technology (Shenzhen) Co., Ltd., Shenzhen, Guangdong Province (CN); Chimel Innolux Corporation, Miao-Li County (TW)

( * ) Notice: Subject to any disclaimer, the term of this patent is extended or adjusted under 35 U.S.C. 154(b) by 118 days.

(21) Appl. No.: 12/384,413

(22) Filed: Apr. 3, 2009

(65) Prior Publication Data

US 2009/0251928 A1    Oct. 8, 2009

(30) Foreign Application Priority Data

Apr. 3, 2008   (TW) ............................... 97112293 A

(51) Int. Cl.
    *H02M 3/335*    (2006.01)
(52) U.S. Cl. ......................................... 363/16; 363/131
(58) Field of Classification Search ................. 363/131, 363/16, 15, 17
    See application file for complete search history.

(56) References Cited

U.S. PATENT DOCUMENTS

| | | | |
|---|---|---|---|
| 4,648,017 A * | 3/1987 | Nerone | 363/80 |
| 5,130,610 A | 7/1992 | Kakitani | |
| 5,138,543 A | 8/1992 | Harm et al. | |
| 5,485,365 A * | 1/1996 | Dan-Harry | 363/132 |
| 7,315,460 B2 * | 1/2008 | Kyono | 363/16 |

FOREIGN PATENT DOCUMENTS

| | | |
|---|---|---|
| CN | 2071863 U | 2/1991 |
| CN | 100355192 C | 12/2007 |

* cited by examiner

*Primary Examiner* — Shawn Riley
(74) *Attorney, Agent, or Firm* — Wei Te Chung

(57) ABSTRACT

A switching power supply circuit includes a direct current (DC) power supply input terminal, a first transformer including a first primary winding, a second transformer, and a pulse generating circuit, and a startup circuit. The pulse generating circuit includes first and second first switching units connected in series and two voltage division resistors connected in series between the DC power supply input terminal and ground, and two capacitors connected in parallel with one of the two voltage division resistors. The second transformer includes a second primary winding connected between control terminal and second conducting terminal of the first switching unit, a second secondary winding; and an assistant winding connected between the control terminal of the second switching unit and ground. The second conducting terminal of the first switching unit is grounded via the second secondary winding, the first primary winding and a capacitor in series.

12 Claims, 2 Drawing Sheets

SWITCHING POWER SUPPLY CIRCUIT

BACKGROUND

1. Technical Field

The present disclosure relates to a switching power supply circuit.

2. Description of Related Art

Switching power supply circuits, exhibiting superior linear characteristics, consuming minimum power, converting electrical power efficiently, and performing steadily, are preferred for use in LCD TVs, displays, and other consumer devices.

FIG. 2 shows a commonly used switching power supply circuit. The switching power supply circuit 1 includes a first rectifying filtering circuit 10, a protection circuit 12, a transformer 13, a second rectifying filtering circuit 15, a pulse width modulation integrated circuit (PWM IC) 16, a rectifying diode 17, a transistor 18, and a resistor 19.

The PWM IC 16 includes a voltage input 161 receiving an operating voltage, and a pulse output 162 generating a pulse signal to a gate electrode of the transistor 18.

The first rectifying and filtering circuit 10 includes two inputs 101, 102 configured to receive an external alternating current (AC) voltage such as a 220V, a full-bridge rectifying circuit 103 configured to convert the 220V AC voltage to a first direct current (DC) voltage, a first filtering capacitor 104 configured to stabilize the first DC voltage, and a first output 105 configured to provide the first DC voltage to the transformer 13. Two inputs of the full-bridge rectifying circuit 103 serve as the two inputs 101, 102. A positive output of the full-bridge rectifying circuit 103 serves as the first output 105. A negative output of the full-bridge rectifying circuit 103 is grounded. The first filtering capacitor 104 is connected between the first output 105 and ground.

The transformer 13 includes a primary winding 131, a secondary winding 132, and an assistant winding 133. The primary winding 131 is electrically connected in parallel with the protection circuit 12. One terminal of the primary winding 131 is connected to the first output 105, and the other terminal of the primary winding 131 is connected to a drain electrode of the transistor 18. A source electrode of the transistor 18 is connected to ground via the resistor 19. A gate electrode of the transistor 18 is connected to the pulse output 162 of the PWM IC 16.

One terminal of the assistant winding 133 is connected to ground. The other terminal of the assistant winding 133 is connected to the voltage input 161 of the PWM IC 16 via the anode and the cathode of the rectifying diode 17 and a transistor (not labeled) in series.

The second rectifying and filtering circuit 15 includes a rectifying circuit 151, a second filtering capacitor 152, and a second output 153. One terminal of the secondary winding 132 is coupled to the second output 153 via the rectifying circuit 151. The other terminal of the secondary winding 132 is grounded. The second filtering capacitor 152 is connected between the second output 153 and ground.

The switching power supply circuit 1 operates as follows:

The external AC voltage is provided to the two inputs 101, 102 of the first rectifying and filtering circuit 10 and is converted to the first DC voltage by the first rectifying and filtering circuit 10. The first DC voltage is provided to the primary winding 131. The assistant winding 133 induces the primary winding 131, generates an operating voltage, and provides the operating voltage to the voltage input 161 of the PWM IC 16 via the rectifying diode 17. Thus the PWM IC 16 generates the pulse signal for switching the transistor 18 on or off. When the transistor 18 is switched on, a first current path is formed sequentially through the first output 105, the primary winding 131, the transistor 18, and the resistor 19. A first current is formed when the first DC voltage provided to the first output 105 is connected to ground via the first current path. The first current through the first current path increases linearly until electromagnetic induction generated in the primary winding 131 reaches a predetermined maximum threshold.

When the transistor 18 is switched off, energy stored in the primary winding 131 transfers to the secondary winding 132. Thus AC voltage across the secondary winding 132 is generated. The second rectifying and filtering circuit 15 converts the AC voltage to the second DC voltage, and provides the second DC voltage to a load circuit (not shown) via the second output 153.

Because the switching power supply circuit 1 includes numerous electric units, volume of the switching power supply circuit 1 is correspondingly large. Furthermore, cost of the PWM IC is high, increasing the expense of the switching power supply circuit 1.

It is thus desirable to provide a switching power supply circuit which can overcome the described limitations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various inventive embodiments of the present disclosure in detail, wherein like numerals refer to like elements throughout.

Figure 1:
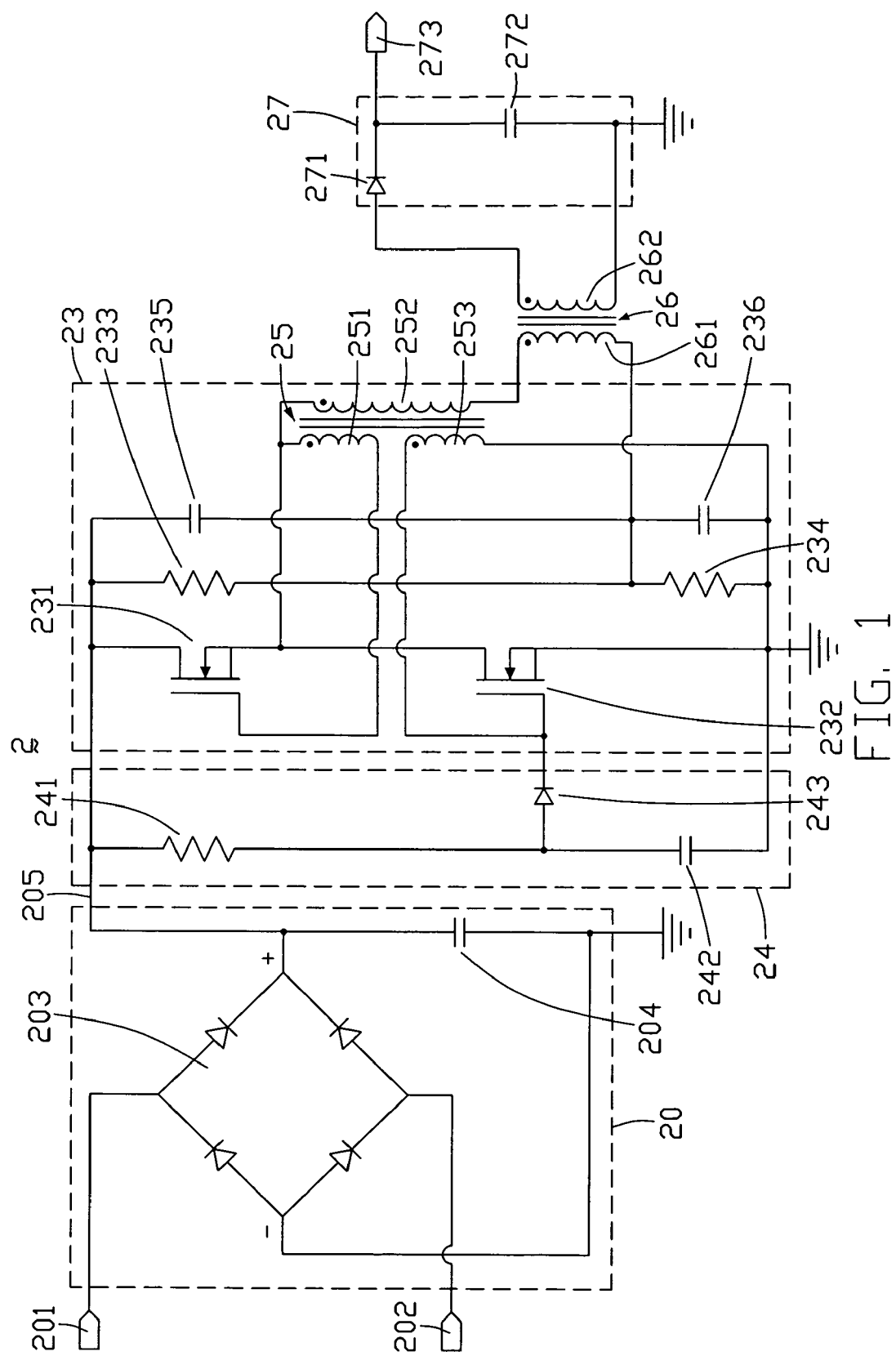
FIG. 1 is a diagram of a switching power supply circuit according to the disclosure.
Figure 2:
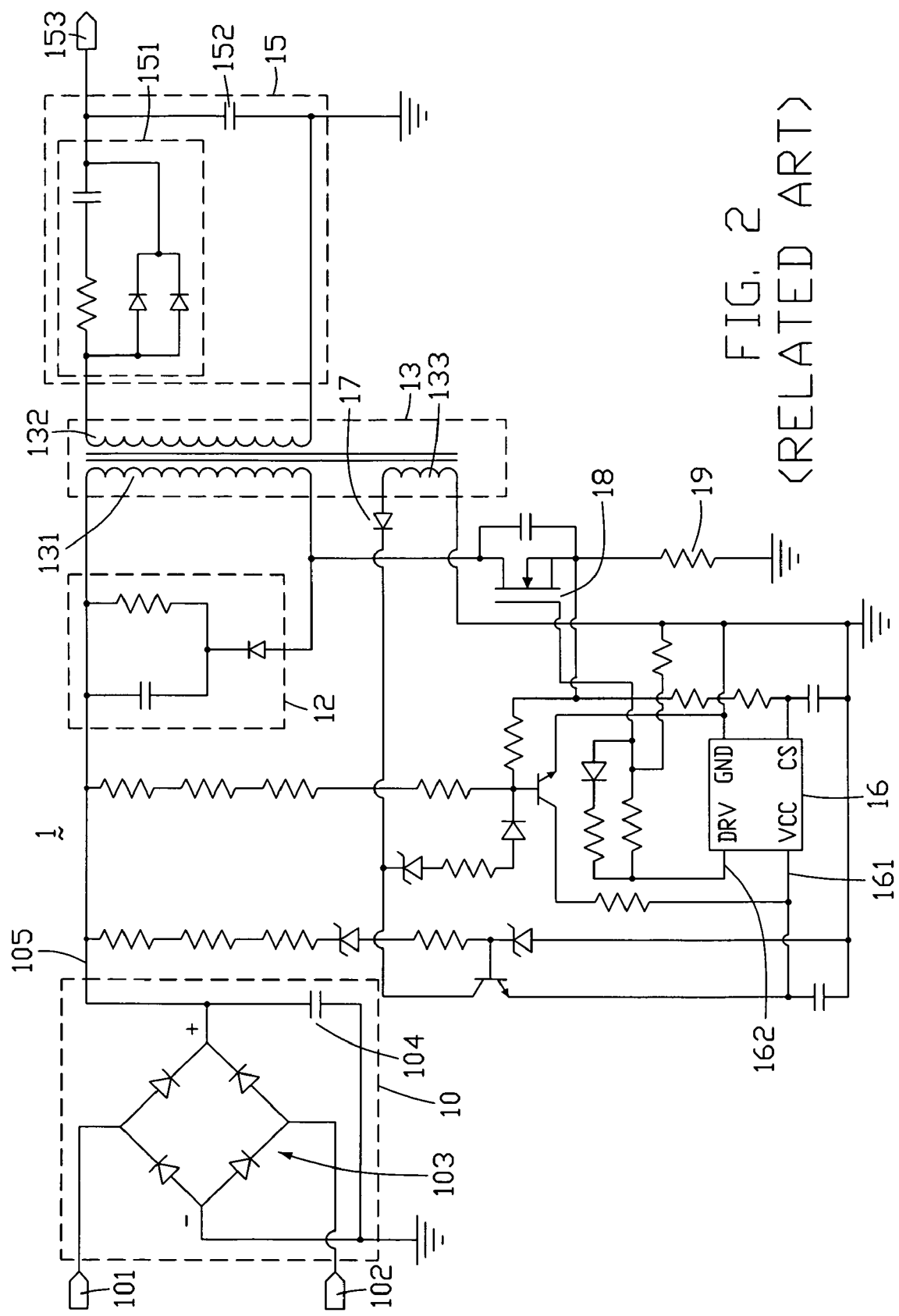
FIG. 2 shows a diagram of a frequently used switching power supply circuit.

FIG. 1 is a diagram of a switching power supply circuit according to the disclosure. The switching power supply circuit 2 includes a first rectifying and filtering circuit 20, a pulse generating circuit 23, a startup circuit 24, a first transformer 26, and a second rectifying and filtering circuit 27. The first transformer 26 includes a first primary winding 261 and a first secondary winding 262.

The first rectifying and filtering circuit 20 includes two inputs 201, 202 configured to receive an external alternating current (AC) voltage such as a 220V AC voltage, a full-bridge rectifying circuit 203 configured to convert the 220V AC voltage to a first direct current (DC) voltage, a first capacitor 204 configured to stabilize the first DC voltage, and a first output 205 configured to output the first DC voltage. Two inputs of the full-bridge rectifying circuit 203 serve as the two inputs 201, 202. A positive output of the full-bridge rectifying circuit 203 serves as the first output 205. A negative output of the full-bridge rectifying circuit 203 is grounded. The first capacitor 204 is connected between the first output 205 and ground.

The startup circuit 24 includes a first resistor 241, a second capacitor 242, and a first diode 243. The first output 205 is connected to ground via the first resistor 241 and the second capacitor 242 in series. A connection node between the first resistor 241 and the second capacitor 242 is connected to a positive terminal of the first diode 243. The startup circuit 24 is configured to provide an initial switching on voltage.

The pulse generating circuit 23 includes a first transistor 231, a second transistor 232, a first voltage division resistor 233, a second voltage division resistor 234, a third capacitor 235, a fourth capacitor 236, and a second transformer 25. The first output 205 is connected to ground via the first voltage division resistor 233 and the second voltage division resistor 234 in series and is connected to ground via the third capacitor 235 and the fourth capacitor 236 in series. The first output 205 is also connected to ground via the first transistor 231 and the second transistor 232 in series, wherein the first output 205 is connected to a source electrode of the first transistor 231, a drain electrode of first transistor 231 is connected to a source electrode of the second transistor 232, and a source electrode of the second transistor 232 is grounded. A connection node between the first and second voltage division resistors 233, 234 is connected to a connection node between the third and fourth capacitors 235, 236. A resistance of the first voltage division resistor 233 is approximately equal to that of the second voltage division resistor 234. The first and second transistors 231, 232 are n-channel metal-oxide-semiconductor field-effect transistors (N-MOSFET).

The second transformer 25 includes a second primary winding 251, a second secondary winding 252, and an assistant winding 253. One terminal of the second primary winding 251 is connected to the source electrode of the first transistor 231. The other terminal of the second primary winding 251 is connected to a gate electrode of the first transistor 231. One terminal of the second secondary winding 252 is connected to the source electrode of the first transistor 231. The other terminal of the second secondary winding 252 is connected to one terminal of the first primary winding 261. The other terminal of the first primary winding 261 is connected to ground via the second voltage division resistor 234. One terminal of the assistant winding 253 is grounded and the other terminal of the assistant winding 253 is connected to a gate electrode of the second transistor 232 and a negative terminal of the first diode 243.

The terminal of the second primary winding 251 connected to the source electrode of the first transistor 231, the terminal of the second secondary winding 252 connected to the source electrode of the first transistor 231, and the terminal of the assistant winding 253 connected to the gate electrode of the second transistor 232 are named the same.

External AC voltage is provided to the two inputs 201, 202 of the first rectifying and filtering circuit 20 and converted to the first DC voltage by the first rectifying and filtering circuit 20. The first DC voltage is provided to the first output 205 to charge the third and fourth capacitors 235, 236. At the same time, the first DC voltage charges the second capacitor 242 via the first resistor 241 until a voltage across the second capacitor 242 exceeds a switching on voltage of the first diode 243. The first diode 241 is switched on and a positive voltage provided to the gate electrode of the second transistor 232 to switch on the second transistor 232. When the second transistor 232 is switched on, the fourth capacitor 236 discharges via the first primary winding 261, the second secondary winding 252, and the activated second transistor 232. A first current through the second secondary winding 252 has a first direction from one terminal of the second secondary winding 252 connected to the first primary winding 261 to the other terminal of the second secondary winding 252. The second primary winding 251 induces the first current and generates a second current. The second current through the second primary winding 251 has a second direction from one terminal of the second primary winding 251 connected to the gate electrode of the first transistor 231 to the other terminal of the second primary winding 251. Thus a positive voltage is provided to the gate electrode of the first transistor 231 to switch on the first transistor 231. The assistant winding 253 induces the first current and generates a third current. The third current through the assistant winding 253 has a third direction from the grounded one terminal of the assistant winding 253 to the other terminal of the assistant winding 253. Thus a negative voltage is provided to the gate electrode of the second transistor 232 to switch off the second transistor 232.

When the second transistor 232 is switched off, the fourth capacitor 236 is recharged. When the first transistor 231 is switched on, the third capacitor 235 discharges via the first transistor 231, the second secondary winding 252, and the first primary winding 261. The first current through the second secondary winding 252 has a reversed first direction. The second current through the second primary winding 251 has a reversed second direction. Thus, a negative voltage is provided to the gate electrode of the first transistor 231 to switch off the first transistor 231. The third current through the assistant winding 253 has a reversed third direction. Thus, a positive voltage is provided to the gate electrode of the second transistor 232 to switch on the second transistor 232. At this time, the fourth capacitor 236 starts to discharge and the third capacitor 235 starts to be recharged.

Switching power supply circuit 2 repeats the described operation to generate an oscillation pulse from the first primary winding 261 of the first transformer 26. The first secondary winding 262 induces the oscillation pulse and generates an AC voltage. The second rectifying and filtering circuit 27 converts the AC voltage into a second DC voltage and provides the second DC voltage to a load circuit (not shown).

The switching power supply circuit 2 employs the startup circuit 24, the first primary winding 261, the second transformer 25, the third and fourth capacitor 235, 236 to generate pulse signals for switching the first and second transistors 231, 232 on and off. Thus the switching power supply circuit 2 requires no PWM IC to control the first and second transistors 231, 232, resulting in lowered costs.

Alternatively, the first and second transistors can be n-channel metal-oxide-semiconductor field-effect transistors (N-MOSFETs), insulated gate bipolar transistors (IGBTs), or other switching units having three terminals. The first primary winding 261 and the second secondary winding 252 can be combined into one winding, in other words, the first and second transformer 26, 25 can be replaced by one transformer.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

The invention claimed is:
1. A switching power supply circuit comprising:
a direct current (DC) power supply input terminal;
a first transformer comprising a first primary winding;
a pulse generating circuit comprising:
 a first switching unit and a second switching unit, each switching unit comprising a control terminal, a first conducting terminal, and a second conducting terminal, the first and second switching units connected in series between the DC power supply input terminal and ground via the conducting terminals;

two voltage division resistors connected in series between the DC power supply input terminal and ground; and two capacitors, each connected in parallel with one of the two voltage division resistors;

a second transformer comprising:

a second primary winding connected between the control terminal and second conducting terminal of the first switching unit;

a second secondary winding; and an assistant winding connected between the control terminal of the second switching unit and ground, wherein the second conducting terminal of the first switching unit is connected to ground via the second secondary winding, the first primary winding and a capacitor in series; and a startup circuit configured for controlling operation of the pulse generating circuit.

2. The switching power supply circuit of claim 1, further comprising a first rectifying and filtering circuit configured to receive an external alternating current (AC) voltage and convert the AC voltage to a first DC voltage.

3. The switching power supply circuit of claim 2, wherein the first rectifying and filtering circuit comprises two inputs configured to receive the external AC voltage, a full-bridge rectifying circuit, a first capacitor, wherein the two inputs of the full-bridge rectifying circuit serve as the two inputs, a positive output of the full-bridge rectifying circuit serving as the DC power supply input terminal, a negative output of the full-bridge rectifying circuit being grounded, and the first capacitor connecting the DC power supply input terminal and ground.

4. The switching power supply circuit of claim 1, wherein the first and second switching units are transistors.

5. The switching power supply circuit of claim 4, wherein the transistors are n-channel metal-oxide-semiconductor field-effect transistors (N-MOSFETs).

6. The switching power supply circuit of claim 5, wherein gate electrodes of the transistors are defined as the control terminals, drain electrodes of the transistors are defined as the first conducting terminals, and source electrodes of the transistors are defined as the second conducting terminals, wherein a terminal of the second primary winding connected to the source electrode of the first transistor, a terminal of the second secondary winding connected to the source electrode of the first transistor, and a terminal of the assistant winding connected to the gate electrode of the second transistor are named the same.

7. The switching power supply circuit of claim 6, wherein the startup circuit comprises a first resistor, a second capacitor, and a first diode, the DC power supply input terminal being connected to ground via the first resistor and the second capacitor in series, a connection node between the first resistor and the first capacitor being connected to a positive terminal of the first diode, and a negative terminal of the first diode being connected to the gate electrode of the second transistor.

8. The switching power supply circuit of claim 1, wherein the two voltage division resistors of the pulse generating circuit have the same resistance.

9. The switching power supply circuit of claim 1, further comprising a second rectifying and filtering circuit, the first transformer further comprising a first secondary winding, the second rectifying and filtering circuit transforming an AC voltage of the first secondary winding into a second DC voltage.

10. The switching power supply circuit of claim 1, wherein the first primary winding and the second secondary winding are combined into one winding.

11. The switching power supply circuit of claim 1, wherein the first and second switching units are p-channel metal-oxide-semiconductor field-effect transistors (P-MOSFETs).

12. The switching power supply circuit of claim 1, wherein the first and second switching units are insulated gate bipolar transistors (IGBTs).

* * * * *